United States Patent
Leiter et al.

(10) Patent No.: US 6,593,379 B1
(45) Date of Patent: Jul. 15, 2003

(54) METHOD FOR CONVERTING A WEAKLY ACID ION EXCHANGER MATERIAL FROM THE H FORM INTO THE CA FORM

(75) Inventors: Klaus Leiter, Völs (AT); Gerhard Walder, Zirl (AT)

(73) Assignee: Watercryst chemiefreie Wasserbehandlung GmbH, Kematen (AT)

( * ) Notice: Subject to any disclaimer, the term of this patent is extended or adjusted under 35 U.S.C. 154(b) by 0 days.

(21) Appl. No.: 09/743,249

(22) PCT Filed: Jul. 8, 1999

(86) PCT No.: PCT/AT99/00174

§ 371 (c)(1),
(2), (4) Date: Jan. 5, 2001

(87) PCT Pub. No.: WO00/02658

PCT Pub. Date: Jan. 20, 2000

(30) Foreign Application Priority Data

Jul. 8, 1998 (AT) ............................................. 1178/98

(51) Int. Cl.$^7$ ................................. C08J 5/20; C08J 7/12
(52) U.S. Cl. ......................... 521/26; 210/670; 210/677; 210/687
(58) Field of Search ................................. 210/670, 677, 210/687, 178, 179, 209, 269; 521/26

(56) References Cited

U.S. PATENT DOCUMENTS

| | | | | |
|---|---|---|---|---|
| 4,263,145 A | * | 4/1981 | Wirth, Jr. ..................... | 210/687 |
| 4,493,907 A | * | 1/1985 | Hedrick et al. .............. | 210/687 |
| 5,371,110 A | | 12/1994 | Philipp et al. ................. | 521/28 |
| 5,635,592 A | * | 6/1997 | Mayer ......................... | 530/210 |

OTHER PUBLICATIONS

WPI/Derwent XP–002118817 & JP54004889, "Converting hydrogen–type cation exchange resin into calcium–type by treating with aqueous calcium hydroxide solution containing ammonium chloride", Jan. 13, 1979.
Chemical Abstracts XP–002118816 & JP50139079, "Heavy metal removal from waste water by ion exchanger", Nov. 6, 1975.
WPI/Derwent XP–002118840 & Research Disclosure–365046 (Sep. 10, 1994), "Converting hydrogen ion forms of cation exchange resins to the calcium form—by treating with calcium chloride solution", Sep. 10, 1994.
Othmer, Kirk, Ion Exchange, 4th edition, vol. 14, p. 739.
Rompp, Ionenaustauschchromatographie, 4th edition, vol. 3, p. 1964, right column—paragraph 2 respectively, p. 1966, left column below "2. Trennung:".
International Search Report for PCT/AT99/00174, Oct. 14, 1999 (2 pages).

* cited by examiner

*Primary Examiner*—Ivars Cintins
(74) *Attorney, Agent, or Firm*—Lorusso Loud & Kelly LLP

(57) ABSTRACT

The invention relates to a method and a device for converting a preferably weak acid ion-exchange material from the H form into the Ca form, according to which the ion-exchange material is brought into contact with an aqueous, preferably saturated, Ca(OH)$_2$ (calcium hydroxide) solution.

7 Claims, 2 Drawing Sheets

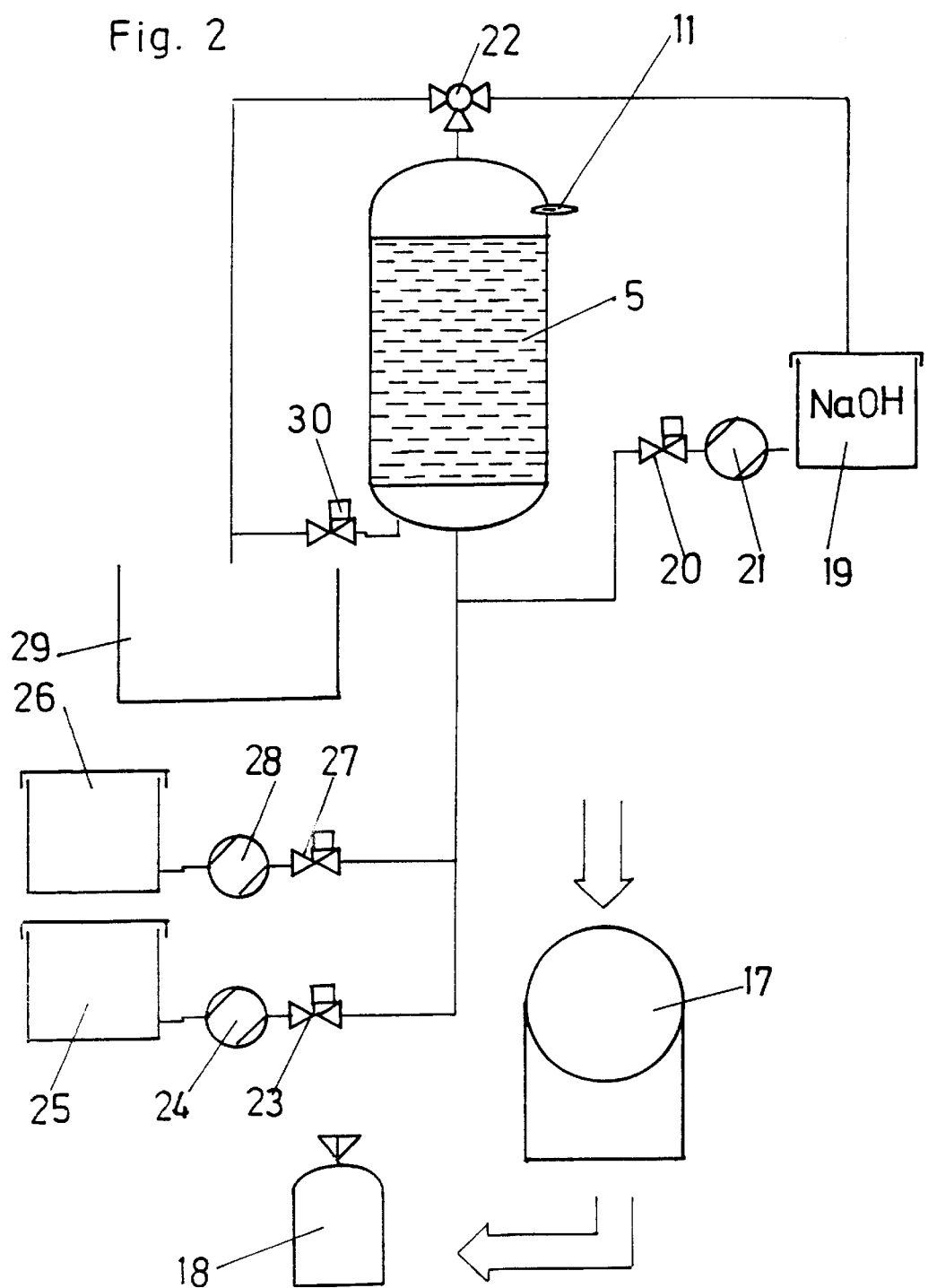

Figure 1:
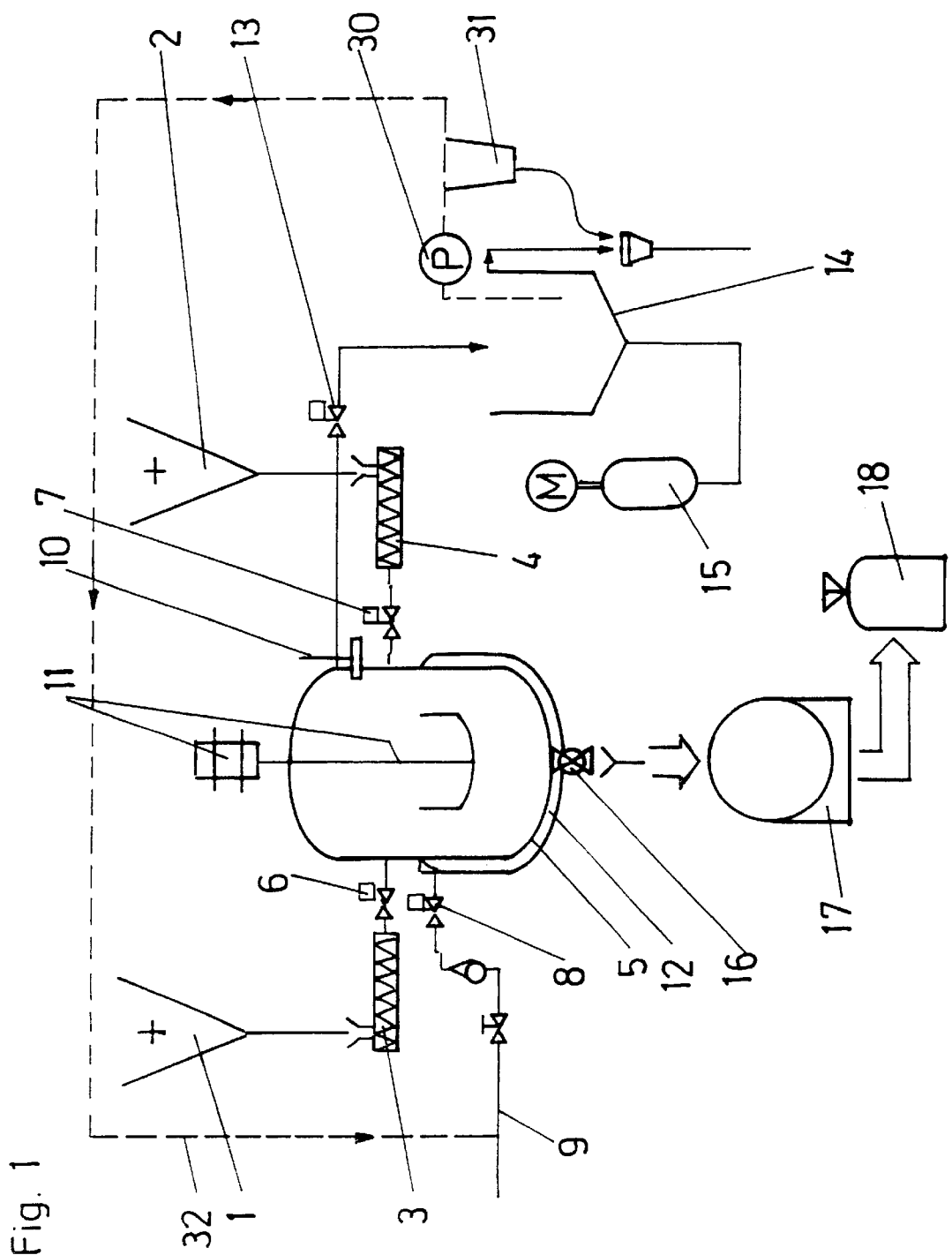

METHOD FOR CONVERTING A WEAKLY ACID ION EXCHANGER MATERIAL FROM THE H FORM INTO THE CA FORM

The invention relates to a method and device for converting a preferably weakly acid ion exchanger material from the H form into the Ca form.

Weakly acid ion exchanger materials in the Ca form are in a position to precipitate lime from calcareous waters by the catalytic route. For this catalytic effect to clearly be of benefit, it is necessary to convert the ion exchanger material as fully as possible into the Ca form. A residual loading of the material with H+ ions (H form) would reduce the pH value of the water in use with water as a result of occurring ion exchange and in this way counter the catalytic action of the functional groups loaded with $Ca^{2+}$ ions.

In order to achieve this, the invention proposes in a first variant that the ion exchanger material is brought into contact with an aqueous, preferably saturated, calcium hydroxide $Ca(OH)_2$ solution. The corresponding device is characterized by a conversion tank with a water inlet, a filling opening for the ion exchanger material and a filling opening for calcium hydroxide $Ca(OH)_2$ or calcium oxide CaO, plus an extraction opening (FIG. 1).

Customary ion exchanger materials available in the trade in the H form (e.g. Lewatit S 8528 from Bayer A G, Leverkusen, Germany) have the property that an ion exchange with other cations becomes possible only from a specific pH value; this pH value threshold lies, depending on the ion exchanger material, at pH values between 3 and 6 (depending also on the opposed ion involved and its concentration). For this reason, there is a limit to a direct conversion of the materials, for example in a $CaCl_2$ solution (calcium chloride solution): the ion exchange stops as soon as the pH value threshold is not reached. Measures are therefore necessary which make the ion exchange possible at high pH values.

With strongly acid ion exchangers, the ion exchange is less sensitive to pH values. However, with these resins also, the ion exchange practically comes to a halt at very low pH values (<1).

$Ca(OH)_2$ has a relatively low solubility in water. At T=20° C. it is 1.7 g/l or 23 mmol/l; the pH value is ca. 12.3 pH units. Initially, this prevents the person skilled in the art from considering $Ca(OH)_2$ as a suitable conversion agent. But if, for example, an aqueous solution is in contact with an adequate sedimentary deposit of $Ca(OH)_2$, some of this sedimentary deposit goes into solution whenever $Ca^{2+}$ ions or $OH^-$ ions are consumed by any processes in the solution and the solubility product is not reached. This post-dissolution of $Ca^{2+}$ or $OH^-$ ions proceeds particularly quickly when the sedimentary deposit is whirled up by stirring and $Ca(OH)_2$ colloids form.

If a weakly or strongly acid ion exchanger material in the $H^-$ form is added to a suspension of the latter kind, there is an immediate ion exchange of $H^-$ ions from the ion exchanger for $Ca^{2+}$ ions from the solution. The $H^-$ ions passing into the solution are immediately neutralized by the $OH^-$ ions present in the solution ($H^+ + OH^- \rightarrow H_2O$). The $Ca^{2+}$ ions and $OH^-$ ions now missing from the solution are replaced by post-dissolution from the sedimentary deposit and the $Ca(OH)_2$ suspension respectively.

The use of a saturated $Ca(OH)_2$ solution has the following advantages:

$Ca(OH)_2$ is a cheap chemical which can be easily handled without special safety equipment.

The conversion needs only as much $Ca(OH)_2$ as is required by stoichiometry. In the case of conversion of the weakly acid ion exchanger Lewatit S 8528 from Bayer with a capacity of 4.3 val/l an introduction of 2.37 mol $Ca(OH)_2$ per litre resin (10% excess) permits a satisfactory conversion of the resin.

As an alternative to $Ca(OH)_2$ as basic chemical, calcium oxide CaO can also be used: CaO reacts with water to give $Ca(OH)_2$.

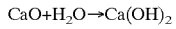

$$CaO + H_2O \rightarrow Ca(OH)_2$$

After the conversion, the converted ion exchanger material is rinsed out with water until the pH value 9 is clearly not reached in the draining water.

The conversion time and the rinsing-out time can be clearly reduced by raising the temperature, preferably to above 40° C. (in particular to T=50° C.).

An alternative possibility for the conversion of a weakly acid ion exchanger material into the Ca form is to proceed via the Na form.

A weakly acid ion exchanger material in the H form can easily be converted into the Na form with concentrated NaOH lye (caustic soda solution); for example, the weakly acid ion exchanger resin Lewatit S 8528 from Bayer can be converted by recycle pumping of a quantity of a 5–6 molar NaOH lye, equivalent to the resin bed quantity, in an exchanger column.

After the resin has been washed out with water, the resin present in the Na form can be now converted in to the Ca form for example by rinsing through three times the resin bed quantity of a 4 molar (calcium chloride) $CaCl_2$ solution in an exchanger column (conversion tank).

The invention will now be described with the help of two examples.

FIGS. 1 and 2 show schematic versions of devices for carrying out two variants of the invention.

In the case of conversion by means of calcium hydroxide, the following individual steps are provided (FIG. 1):

The ion exchanger material and a precisely matched quantity of $Ca(OH)_2$ are conveyed from the respective storage tanks 1,2 by means of conveyor screws 3,4 into the conversion tank 5 (valve 6 and valve 7 are open during loading). By opening valve 8, the tank is filled up to the overflow with water from the inlet 9 (fill-level switch 10). All the valves then close and the stirrer 11 begins to operate; if it is wished to carry out the conversion at higher temperatures, heating to the target temperature by means of a heater 12 begins at the same time. The fitted temperature sensor monitors the temperature profile; the pH and conductivity sensors 10 report on the loading process.

Once the loading process is concluded, the rinsing of the resin (ion exchanger material) begins. For this, the overflow valve 13 and the water supply valve 8 are opened. The stirrer 11 remains switched on during the rinsing. To prevent the resin from being rinsed out of the tank 5, a fine grid, which retains the resin, is integrated at the entrance to the overflow line. In order to trap the $Ca(OH)_2$ colloids present in the draining water at the start of the rinsing, it is expedient to first pass the draining rinse water through a treatment tank 14. The deposited colloids can either be sucked off from the bottom of the treatment tank or they are converted into $CaCO_3$ crystals by blowing in atmospheric $CO_2$ (compressor 15). In the latter case, a fine lime sludge remains, which can also be sucked off. Where necessary, the pH value of the discharge water must also be reduced (to pH value<9) by $CO_2$ or by adding acid, in order to be able to introduce the rinsing water into the drains. In order to minimize the consumption of rinsing water, and on ecological grounds (ecobalance), it is expedient to re-use the discharge water which has been treated and had its pH value reduced as rinsing water and pump it back into the conversion tank by means of a pump. In recycle operation, it is recommended to use, instead of a treatment tank, a hydrocyclone which efficiently separates off $Ca(OH)_2$ colloids and lime crystals.

The rinsing process is also monitored by the pH value probe and the conductivity probe. If the pH value falls well below the value 9 in the conversion tank, the rinsing out of the $Ca(OH)_2$ colloids is concluded and the supply of water can be stopped (closure of the valve 8).

Provision can also be made to return the rinsing water to the inlet via a pump 30 and a hydrocyclone 31 over a return line 32.

In order to pre-condition the resin for its use at high temperatures and at the same time disinfect the resin, the water in the tank is then heated to ca. 80° C. and left at this temperature for ca. 1 hour, being stirred the while.

After this period has expired, the resin is rinsed by opening valves 8 and 13.

The evacuation gate 16 is then opened and the converted resin drained into a tank with a perforated base.

The converted resin is allowed to drip and is then dried in a drying oven 17 (at T=90° C. over ca. 12 hours).

The dried resin is removed from the oven and sterile-packed (packs 18).

A prototype of this conversion unit has the following data for example:

| | |
|---|---|
| Conversion tank: | 200 capacity |
| Maximum resin quantity used: | 80 l |
| $Ca(OH)_2$ quantity with 80 l Lewatit S 8528 (10% excess) | 14 kg |
| Quantity of water during the conversion | ca. 120 l |
| Quantity of rinsing water | 2 m³ |

FIG. 2 shows schematically the structure of a unit in which the conversion from the H form into the Ca form takes place via the Na form:

In the centre of such a unit stands an ion exchanger column (conversion tank 5) which is to be filled with the resin to be converted (e.g. via a filling opening, not shown). Fitted in the base of the column 5 are special nozzles whose task is to distribute the conversion agent appropriately. The loading process takes place in the fixed bed, and the rate of rise of the conversion agents is not to exceed a value of 5 m/h, in order to make possible a uniform loading of the resin content. Only during the rinsing of the resin (ion exchanger) with water is a higher throughflow speed used. In order to prevent a flushing out of the resin during rinsing, an upper nozzle base is integrated in the tank.

This process comprises the following individual steps:

Pouring of the resin into the column 5. Preparation of the NaOH lye (4–6 molar) necessary for the conversion into the Na form in the tank 19. By opening the valve 20 and switching on the pump 21, the caustic soda solution is circulated via the column (3-way valve 22 is opened towards NaOH container 19). The loading process is monitored by measuring the conductivity and the pH value (sensors 11). When the conversion into the Na form is concluded, the resin is rinsed out of the tank 25 with demineralized water by opening valve 23 and switching on the pump 24 (ca. 3–5 times the resin volume, 3-way-valve is opened towards NaOH tank). The drained caustic soda solution and the rinsing water are collected in the NaOH tank 19; this brine is evaporated until the necessary concentration is reached or concentrated by adding NaOH tablets and can be re-used for further loading processes. A corresponding quantity of 3–4 molar CaCl solution is then prepared (tank 26 ) and slowly forced through the column 5 by opening valve 27 and switching on the pump 28 (rate of rise ca. 1–5 m/h). The progress of the transfer loading is monitored via conductivity and pH value measurements. The 3-way valve 22 is opened towards collection tank 29. When loading is concluded, the liquid is drained into the column by opening the valve 30. The resin is then rinsed with demineralized water (3-way valve 22 open towards collection tank 29), removed from the column, dried in a rotary oven 17 (at T=90° C. over 12 h) and sterile-packed.

An example of the dimensions of such an ion exchanger column which is provided for the conversion of at most 80 l resin:

| | |
|---|---|
| Internal diameter: | $D_I$ = 40 cm |
| Height: | 1 m |
| Quantity of NaOH (for 80 l resin Lewatit S 8528) | 240 l 4–6 molar NaOH |
| Quantity of $CaCl_2$ (for 80 l resin Lewatit S 8528) | 240 l 3–4 molar $CaCl_2$ |
| Rinsing distillate | ca. 1 m³ |

The latter process is more costly in technical and resource terms, compared with the method according to FIG. 1, but likewise delivers a satisfactory result, namely an ion exchanger present practically entirely in the Ca form.

What is claimed is:

1. A method for converting a weakly acid ion exchanger material from the H form into the Ca form, wherein the ion exchanger material is brought into contact with an aqueous, saturated calcium hydroxide $Ca(OH)_2$ solution continuously being in contact with still-undissolved calcium hydroxide.

2. The method according to claim 1, wherein the ion exchanger material is poured into a tank for the calcium hydroxide solution, the undissolved calcium hydroxide being provided as sedimentary deposit.

3. The method according to claim 1, wherein the calcium hydroxide solution is kept in motion during the contact with the ion exchanger material.

4. The method according to claim 1, wherein the calcium hydroxide solution is raised to a higher temperature above 40° C.

5. The method according to claim 1, wherein the converted ion exchanger material is dried.

6. The method according to claim 5, wherein the converted ion exchanger material is dried in a rotary drying oven or fluid-bed drying oven.

7. The method according to claim 1, wherein the ion exchanger material is rinsed with rinsing water after the conversion and the pH value of the discharging rinsing water is reduced by blowing in air or $CO_2$ and/or adding acid, so that it can be introduced into the drains, or the water whose pH value has been reduced is re-used as rinsing water after sedimentation of $Ca(OH)_2$ or lime colloids in a treatment tank or their separation in a hydrocyclone and pumped back into the conversion tank for rinsing.

* * * * *